United States Patent
Goodman et al.

(10) Patent No.: US 12,549,357 B2
(45) Date of Patent: Feb. 10, 2026

(54) MANAGING KEY ROTATION FOR ENDPOINT DEVICES USING RE-KEYING RULES

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

(*) Notice: Subject to any disclaimer, the term of this patent is extended or adjusted under 35 U.S.C. 154(b) by 58 days.

(21) Appl. No.: 18/619,659

(22) Filed: Mar. 28, 2024

(65) Prior Publication Data
US 2025/0310100 A1 Oct. 2, 2025

(51) Int. Cl.
*H04L 29/06* (2006.01)
*H04L 9/08* (2006.01)
*H04L 9/14* (2006.01)

(52) U.S. Cl.
CPC .............. *H04L 9/0891* (2013.01); *H04L 9/14* (2013.01)

(58) Field of Classification Search
CPC ................................ H04L 9/0891; H04L 9/14
See application file for complete search history.

(56) References Cited

U.S. PATENT DOCUMENTS

| | | | |
|---|---|---|---|
| 2017/0257214 A1* | 9/2017 | Stufflebeam | H04L 63/20 |
| 2023/0283455 A1* | 9/2023 | Shaffer | H04L 9/3247 713/171 |

* cited by examiner

*Primary Examiner* — Evans Desrosiers
(74) *Attorney, Agent, or Firm* — WOMBLE BOND DICKINSON (US) LLP

(57) ABSTRACT

Methods and systems for validating key rotation requests for endpoint devices are disclosed. The key rotation requests may be signed by one or more signing systems according to a set of re-keying rules for the endpoint device. The set of the re-keying rules may indicate that key rotation requests may be valid if signed using at least two different keys. The set of the re-keying rules may also indicate that each of the at least the two different keys be from a different grouping of keys of multiple groupings of keys included in a secure key repository. Each grouping of keys may be associated with a different organization. Therefore, key rotation requests may be serviced if signatures associated with the key rotation requests meet the re-keying rules thereby decreasing a likelihood of compromise of the endpoint devices via compromise of a key.

20 Claims, 10 Drawing Sheets

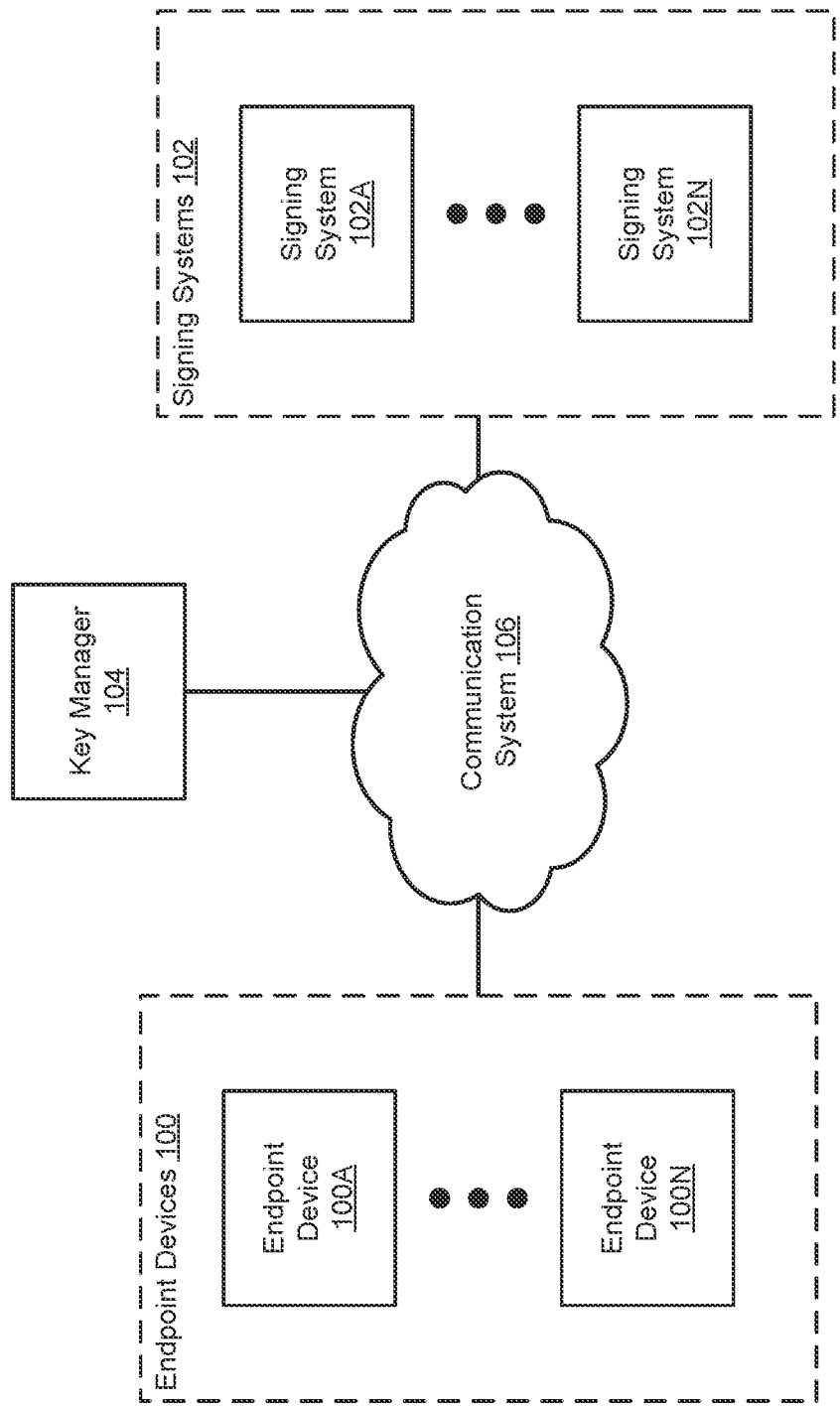

MANAGING KEY ROTATION FOR ENDPOINT DEVICES USING RE-KEYING RULES

FIELD

Embodiments disclosed herein relate generally to endpoint devices. More particularly, embodiments disclosed herein relate to managing key rotation for endpoint devices using re-keying rules for the endpoint devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
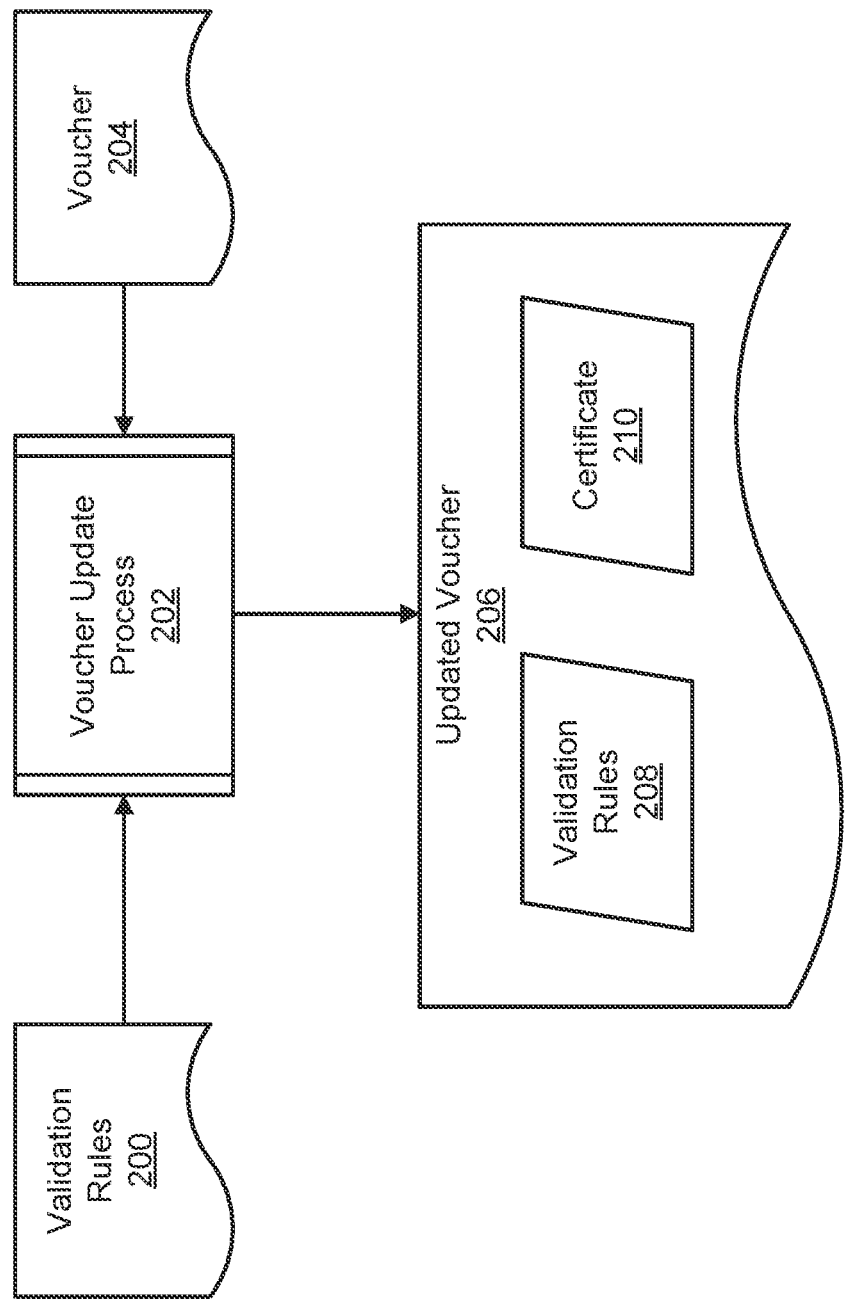
FIGS. 2A-2F show data flow diagrams in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing endpoint devices. The endpoint devices may provide computer-implemented services to downstream consumers of the services throughout a distributed environment. Performance of the computer-implemented services may be managed and/or facilitated by one or more entities vested with authority over the endpoint devices (e.g., orchestrators, owners of the endpoint devices, signing systems, and/or other devices).

The entities vested with the authority over the endpoint devices may provide workorders to the endpoint devices to facilitate provision of the computer-implemented services. Prior to servicing a request included in a workorder, the endpoint devices may validate that the workorder originated from an entity with authority over the endpoint devices. The workorder may be signed (e.g., by a signing system) and the endpoint devices may utilize the signature to discriminate trustworthy from untrustworthy workorders. The signature may be generated using one or more trusted keys (e.g., a private key of a public private key pair).

However, compromise of the trusted key by an unauthorized entity may allow the unauthorized entity to sign workorders and distribute the workorders to the endpoint devices. To prevent unauthorized entities from utilizing compromised keys, the keys used by signing systems throughout the distributed environment may be rotated (e.g., replaced). Keys may be rotated according to a schedule for key rotation, in response to a potential compromise of one or more keys, and/or for any other reason. Key rotation may be performed with permission from a root of trust, a "master" key, and/or with permission from another source of authority over keys throughout a distributed environment. However, if the source of authority is compromised, key rotation may be unreliable.

To manage key rotation without providing authority over the key rotation to a single entity, a set of re-keying rules may be implemented. The set of the re-keying rules may indicate that requests for key rotation must be multiply signed by at least two keys. In addition, the re-keying rules may also specify that the signatures be applied by different signing systems and that the keys used for signing be associated with different entities that authorize use of the keys in the signing. By doing so, compromise of signing systems may be less likely to result in unauthorized rotation of keys.

For example, to perform unauthorized key rotation, a malicious entity may be required to compromise multiple signing systems. Because the signing systems may be implemented by different organization with different security frameworks, compromise of multiple signing systems sufficient to sign requests maliciously may be unlikely.

Thus, embodiments disclosed herein may address, among other technical problems, the technical problem of security in systems that rely on cryptographic verification such as signatures. Because signatures may only provide security when the keys and processes used in the signing remain secure, even a cryptographically signed data structure may still be untrustworthy. To address this technical problem, embodiments disclosed herein may facilitate multiple signing of requests and/or other data structures thereby improving the trustworthiness of the signed requests.

In an embodiment, a method of managing security for an endpoint device is provided. The method may include: obtaining a first key rotation request, the first key rotation request indicating that at least a first key of multiple keys is to be rotated, and the first key rotation request comprising: a first signature generated by a first signing system and using a second key of the multiple keys; and a second signature generated by a second signing system and using a third key of the multiple keys; making a first determination, based on the first key rotation request, regarding whether the second key and the third key meet re-keying rules for the endpoint device, the re-keying rules allowing at least the first key to be rotated based on at least two keys of the multiple keys that are different from the first key; and in an instance of the first determination in which the second key and the third key meet the re-keying rules for the endpoint device: servicing the first key rotation request to obtain updated multiple keys.

The re-keying rules may utilize the updated multiple keys after the first key rotation request is serviced.

The first key rotation request may be part a staggered key rotation process for the multiple keys, and the staggered key rotation process may include a second key rotation request, and the method may also include: obtaining the second key rotation request at a point in time after the first key rotation request is obtained, the second key rotation request indicating that the second key is to be rotated and the second key rotation request including: a third signature generated by a third signing system and using a replaced key of the updated multiple keys; and the second signature; and making a second determination, based on the second key rotation request, regarding whether the replaced key and the second key meet the re-keying rules for the endpoint device, the re-keying rules allowing the second key to be rotated based on at least two keys of the updated multiple keys that are different from the second key; and in an instance of the second determination in which the replaced key and the second key meet the re-keying rules for the endpoint device: servicing the second key rotation request to obtain second updated multiple keys.

The first key rotation request may indicate that all keys of the multiple keys are to be rotated, and the re-keying rules may require that the first key rotation request includes signatures generated with all of the multiple keys.

The re-keying rules may specify that the first key rotation request be multiply signed with at least two different keys.

The re-keying rules may also specify that the first key is not one of the at least two different keys.

The re-keying rules may also specify that the first key of the at least two different keys be from a first pool of keys and the second key of the at least two different keys be from a second pool of keys.

The re-keying rules may also specify that the first pool of keys and the second pool of keys be any two different pools of keys of multiple pools of keys.

The first pool of keys may include keys associated with a first organization and the second pool of keys may include keys associated with a second organization.

The re-keying rules may also specify that the first key rotation request be multiply signed with two keys from a first pool of keys and two keys from a second pool of keys.

The method may also include: after the updated multiple keys are obtained: obtaining a workorder for performance by the endpoint device; evaluating whether to perform the workorder using at least the updated multiple keys; in an instance of the evaluating where the workorder is to be performed: performing action based on the workorder to provide computer implemented services.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, and/or any other type of service that may be implemented with a computing device.

To provide the computer-implemented services, the system may receive workorders from entities vested with authority over the endpoint devices. The endpoint devices may host applications that provide the computer-implemented services. The applications may use computing resources (e.g., processing resources, memory resources, etc.) of a host system to provide the computer-implemented services.

The requests may be signed, for example, by a private key of a public private key pair maintained by a signing system (e.g., a device). The endpoint device may utilize a public key of the public private key pair to validate the signature. The public key may have been previously provided to the endpoint device as a portion of, for example, an ownership voucher for the endpoint device. The endpoint may service the request if the signature is successfully validated.

Keys (e.g., public private key pairs) maintained by signing systems may be rotated over time in order to decrease a likelihood of compromise of a retained key. The keys may be rotated according to a key rotation schedule (e.g., every month), in response to a suspected compromise event, and/or for other reasons (e.g., in response to a request from a signing system). By doing so, keys used to sign workorders for the endpoint devices may be less vulnerable to compromise by unauthorized entities.

However, key rotation may be performed with permission from an entity with authority over the keys to be rotated. Therefore, authenticity of the key rotation request may depend on a manner in which the key rotation request is signed. If signed using a signing system that is compromised (e.g., due to a bug in the system, a compromised user of the system, etc.), then the signed key rotation request may not be reliable. As the distributed environment may be large and may include many endpoint devices, relying on a single key (and/or entity hosting the key) to remain secure may increase a likelihood of compromise of the distributed environment.

In general, embodiments disclosed herein may provide methods, systems, and/or devices for managing security for endpoint devices through key rotation request validation. To validate the key rotation requests prior to rotating keys, re-keying rules for the endpoint device may be evaluated. The re-keying rules may indicate that the key rotation request be signed with two or more keys to be considered trustworthy. For example, the re-keying rules may require that the key rotation request be signed with two private keys that are trusted by the entity managing key rotation.

The re-keying rules may also require that the request be signed with keys that do not have any dependency between them and may provide flexibility in which specific keys and signing frameworks be used. For example, the re-keying rules may require that multiply signed key rotation requests be signed using (i) different signing frameworks managed by different organizations or groups, (ii) be signed using different private keys, (iii) be signed using multiple signing frameworks and private keys from a range of different signing frameworks and private keys, (iv) be signed a number of times that is dependent on a number of available signing keys, and/or may include different, fewer, and/or additional requirements.

The re-keying rules may be based on security preferences of an owner of the endpoint device and/or another entity vested with authority over the endpoint device. For example, the endpoint device may be purchased by a customer from a manufacturer of the endpoint device. The manufacturer may communicate directly with the customer to determine security preferences (e.g., the re-keying rules) from the customer.

To implement the re-keying rules, a key rotation request may be obtained. The key rotation request may request initiation of: (i) a staggered re-keying process in which any number of keys are sequentially rotated over time, and/or (ii) a simultaneous re-keying process in which all keys indicated by the key rotation request are rotated at the same time.

Upon receiving a signed key rotation request, a key manager may utilize the re-keying rules to determine whether the key rotation request originated from trusted entities.

To provide the above noted functionality, the system of FIG. 1 may include any number of endpoint devices 100, signing systems 102, and/or key manager 104. Each of these components is discussed below.

Signing systems 102 may be systems usable to sign key rotation requests. To do so, each of signing systems 102 may include functionality to (i) establish portions of signing pipelines that are able to sign key rotation requests in accordance with re-keying rules, and (ii) automatically forward signed key rotation requests along signing pipelines. To establish the portions of the re-keying rules, any of signing systems 102 and/or other entities may analyze re-keying rules implemented by endpoint devices and generate a description of a signing pipeline that is able to sign key rotation requests in a manner that meets the requirements of the re-keying rules. The resulting signing pipeline may be used to multiply sign key rotation requests. Refer to FIGS. 2B-2C for additional details regarding signing pipelines.

Signing systems 102 may sign other data structures including workorders for endpoint devices, communications to other systems in the distributed environment, etc.

Endpoint devices 100 may provide computer-implemented services by servicing requests (e.g., requests to perform workorders, requests to modify configurations of software components) from signing systems 102 (and/or other entities) following onboarding of endpoint devices 100 to the distributed environment. To perform their functionality, endpoint devices 100 may: (i) obtain a workorder, the workorder indicating a request for endpoint devices 100, and/or (ii) determine whether the workorder is trustworthy based on validation rules for endpoint devices 100. The validation rules may allow for the workorder to be considered trustworthy based on at least two different keys.

The validation rules may include requirements similar to those described with respect to the re-keying rules and may be applied to workorders received by endpoint devices 100. If a workorder is determined to be trustworthy, endpoint devices 100 may service the request included in the workorder. Refer to FIG. 2D for additional details regarding using the validation rules to validate requests prior to servicing the requests.

Key manager 104 may: (i) manage a trusted key repository including public keys of any number of public private key pairs assigned to signing systems 102, (ii) manage rotation of any number of keys stored in the trusted key repository, (iii) manage addition of new trusted keys to the trusted key repository, (iv) validate key rotation requests, and/or (v) otherwise manage use of keys throughout the distributed environment.

To validate key rotation requests, key manager 104 may: (i) obtain a key rotation request, (ii) determine whether the key rotation request meets the re-keying rules for endpoint devices 100, and/or (iii) if the key rotation request meets the re-keying rules, servicing the key rotation request to obtain at least an updated key.

Figure 3A:
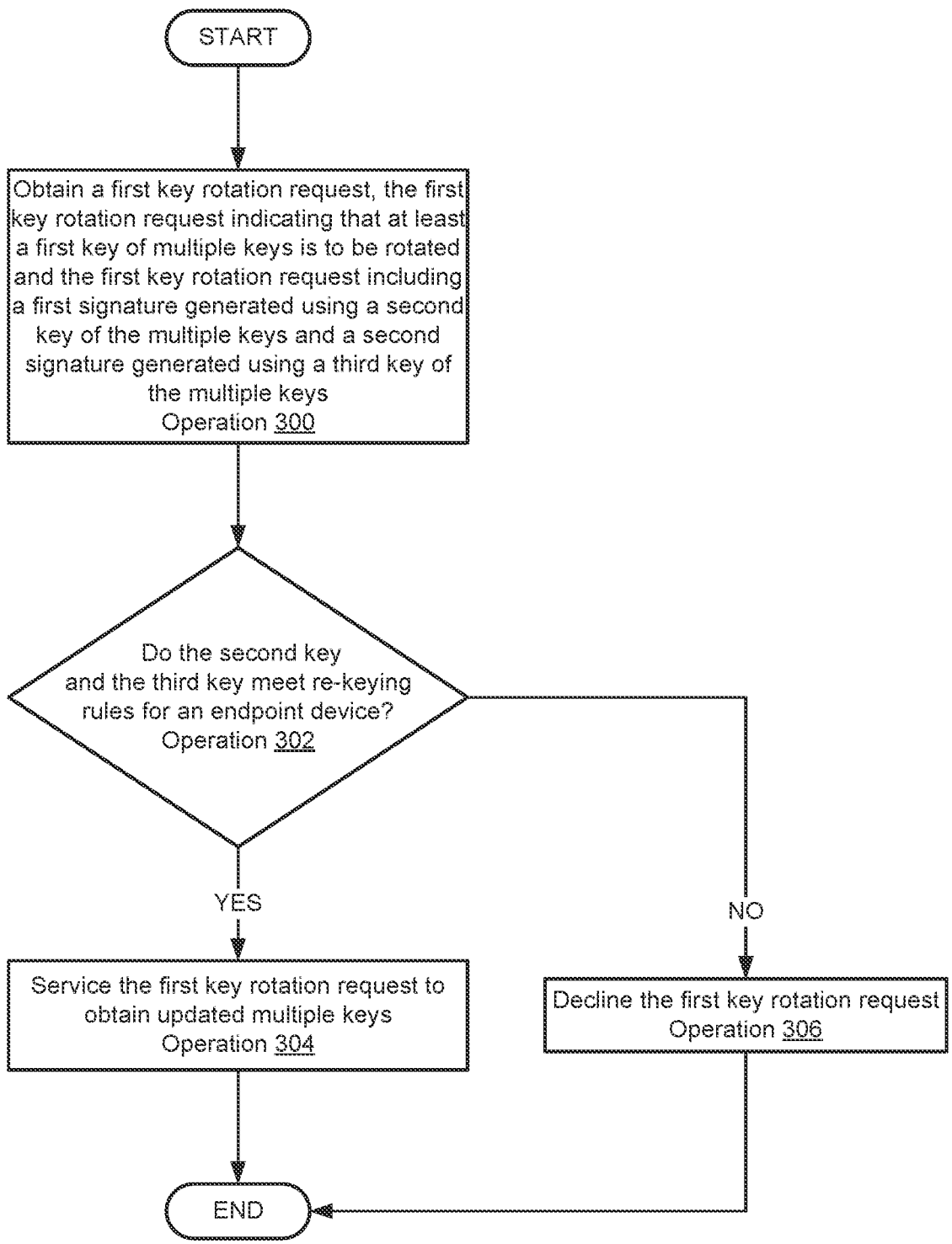
FIGS. 3A-3B show flow diagrams illustrating methods in accordance with an embodiment.
Figure 3B:
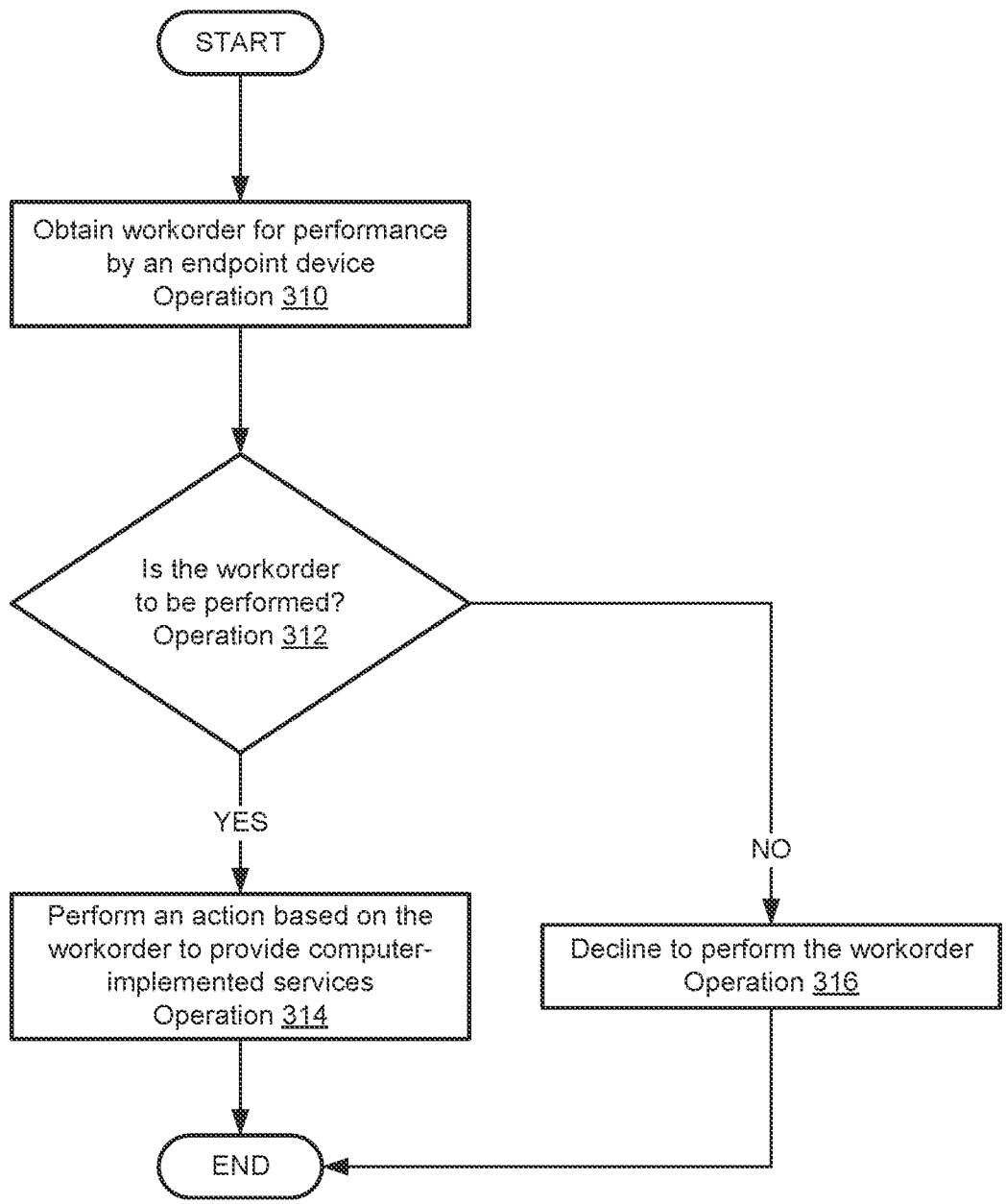

When providing their functionality, any of (and/or components thereof) signing systems 102, endpoint devices 100, and/or key manager 104 may perform all, or a portion, of the methods illustrated in FIGS. 3A-3B.

Any of (and/or components thereof) signing systems 102, endpoint devices 100, and key manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2F. In these diagrams, flows of data and processing of data are illustrated using different sets of shapes. A first set of shapes (e.g., 200, 204, etc.) is used to represent data structures, a second set of shapes (e.g., 202, 222, etc.) is used to represent processes performed using and/or that generate data, a third set of shapes (e.g., 208, 210, etc.) is used to represent data included in a data structure, and a fourth set of shapes (e.g., 102, 238) is used to represent systems (e.g., components of FIG. 1, other systems).

Figure 2B:
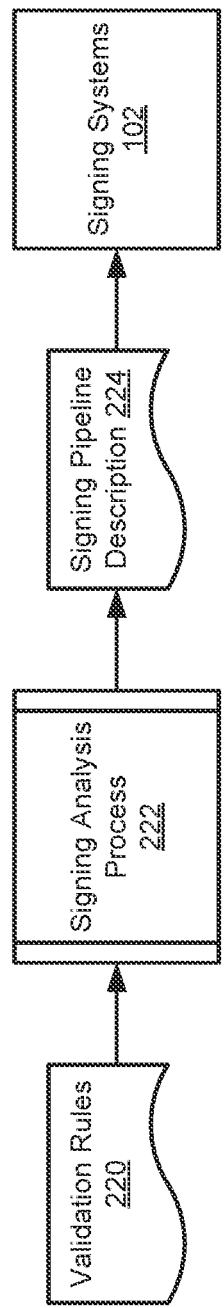
Figure 2C:
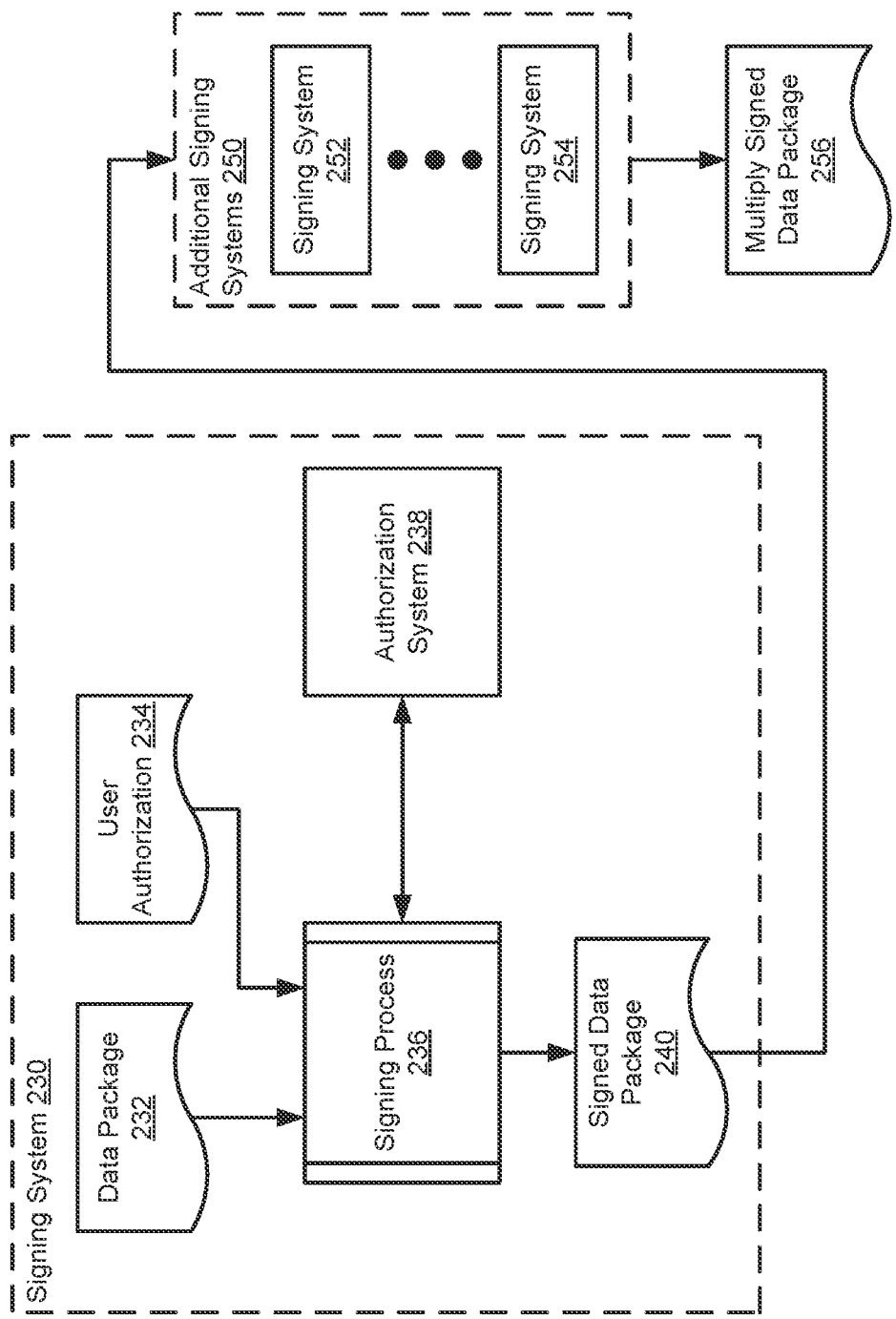
Figure 2D:
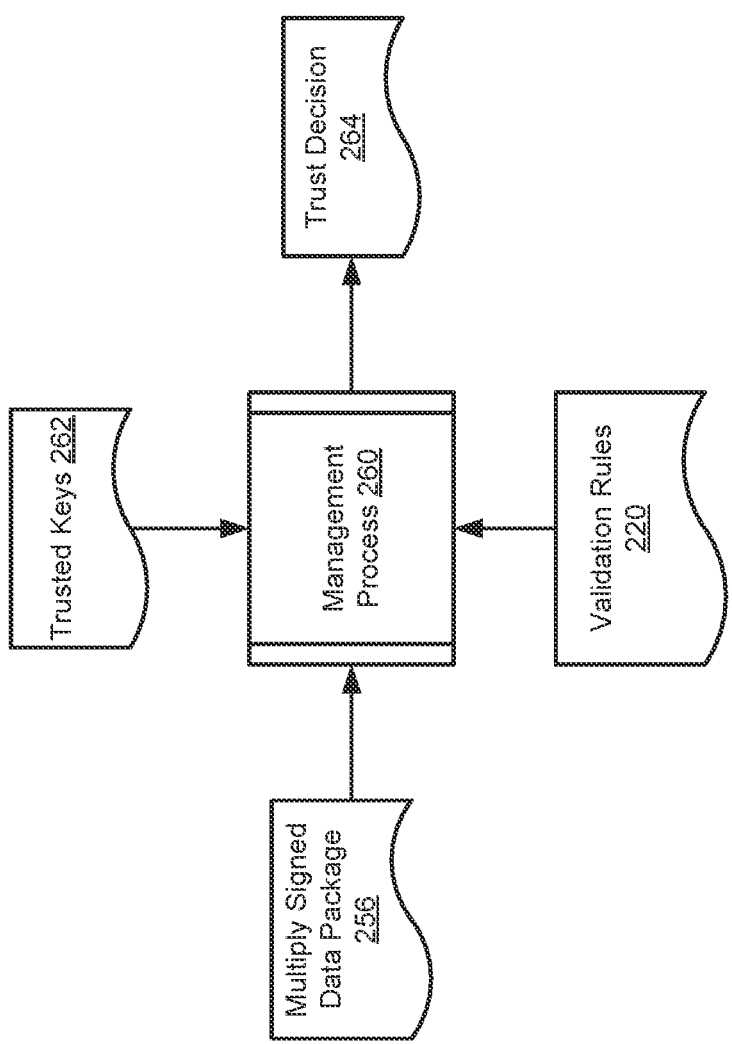

Turning to FIG. 2A, a first data flow diagram in accordance with an embodiment is shown. When authority over an endpoint device (e.g., 100A) is transferred to another entity, a voucher (e.g., an ownership voucher) may be updated. Voucher 204 may include the ownership voucher for endpoint device 100A prior to updating the ownership voucher to reflect delegation of authority over endpoint device 100A to a new entity.

For example, endpoint device 100A may be built by a manufacturer of endpoint device 100A and a voucher management service (and/or another entity) may generate voucher 204 for endpoint device 100A. Voucher 204 may indicate that a first entity (e.g., the manufacturer) has authority over endpoint device 100A. Voucher 204 may include: (i) verification data usable to validate that the manufacturer has authority over endpoint device 100A, and (ii) at least one delegation of authority to a public key of a public private key pair associated with the manufacturer.

The verification data may include the public key associated with the manufacturer usable to verify a private key of the public private key pair kept secret by the manufacturer. The private key may be any private key associated with the manufacturer (e.g., a string of numbers and/or letters known kept secret by the manufacturer) usable for generating signatures. The corresponding public key for the private key may be any public key (e.g., a string of letters and/or numbers) associated with the manufacturer that is known publicly and is usable to verify signatures generated by the private key.

Validation rules 200 may be obtained from an owner of the endpoint device and/or another entity with authority over the endpoint device and may specify any number of requirements that must be met for a request to be trusted. The requirements may specify (i) a number of signatures that must be verifiable using keys, (ii) diversity for the keys used to verify the number of signatures, and/or (iii) other rules.

For example, a set of trusted keys (not shown) may be divided into groups. Each group may include public keys from public private key pairs used by different signing systems to sign requests. In this example, validation rules 200 may specify that (i) a first number of signatures of a multiply signed request must be verifiable using public keys from a first group of keys of the set of the trusted keys, and (ii) a second number of signatures of the multiply signed request must be verifiable using public keys from a second group of keys in the set of the trusted keys. If met, the multiply signed request may be trusted. Refer to FIG. 2C for additional details regarding the validation rules.

Voucher 204 and validation rules 200 may be used to perform voucher update process 202. Voucher update process 202 may include modifying voucher 204 to obtain updated voucher 206 (e.g., including validation rules 208 and certificate 210). Voucher updated process 202 may be performed in response to a transaction in which endpoint device 100A is sold by a first entity (e.g., a manufacturer) to a second entity (e.g., a customer. By doing so, authority over endpoint device 100A may be transferred to the customer.

Updated voucher 206 may indicate the second entity with authority over endpoint device 100A (e.g., the customer). Updated voucher 206 may include, for example, certificate 210 which may include one or more certificates. Each certificate of the one or more certificates may include: (i) a delegation statement, (ii) a public key for an entity to which authority is being delegated (e.g., the customer), (iii) a signature generated with a private key for the entity delegating the authority (e.g., the manufacturer), and/or (iv) other information.

The delegation statement may indicate which privileges are being delegated to the second entity. For example, the delegation of authority may indicate that all authority to manage, onboard, and/or otherwise modify the endpoint device is being delegated to the second entity. The second entity may be, for example, a customer purchasing the endpoint device to perform computer-implemented services using the endpoint device.

The public key may be any public key (e.g., a string of letters, numbers, and/or other characters) associated with the second entity that is publicly available.

The signature generated using the private key (e.g., a private key kept secret by the first entity) may include cryptographic information generated using a payload (e.g., certificate 210, validation rules 208) and the private key. The cryptographic information may include a hash of the information and/or any other type of cryptographic information.

Validation rules 208 may also be included as a portion of the payload as previously mentioned. Validation rules 208 may be a copy of validation rules 200 and may indicate how requests (e.g., to onboard endpoint device 100A, to modify operation of endpoint device 100A) are to be signed in order for the requests to be considered valid.

Updated voucher 206 may be provided to an orchestrator to be used in onboarding of endpoint device 100A.

Following updating the voucher and providing the updated voucher to the orchestrator, entities with knowledge of the validation rules (e.g., signing systems 102) may utilize the validation rules to sign requests to modify operation of endpoint device 100A.

Turning to FIG. 2B, a second data flow diagram in accordance with an embodiment is shown. To sign requests in accordance with validation rules 220, a signing pipeline may be established using any number of signing systems (e.g., 102).

To establish the signing pipeline, signing analysis process 222 may be performed. During signing analysis process 222, validation rules 220 may be ingested and analyzed to identify requirements for requests to be trusted and executed by an endpoint device (e.g., 100A). The requirements may include, for example, (i) numbers of times the requests may need to be signed, (ii) diversity of keys used to sign the requests, and (iii) diversity of signing systems used to sign the requests.

Based on these requirements, signing pipeline description 224 may be generated. Signing pipeline description 224 may be description of a signing pipeline that will generate signed requests that will pass validation using the validation rules. Signing pipeline description 224 may be generated procedurally based on the requirements for the requests, and/or via other methods.

Once obtained, signing pipeline description 224 and/or information based on it may be provided to signing systems 102. Signing systems 102 may ingest signing pipeline description 224 and conform at least part of its behavior to that specified by signing pipeline description 224. Refer to FIG. 2C for additional details regarding signing pipelines.

For example, signing systems from different organizations may receive copies of signing pipeline description 224. Based on the description, each portion of the signing pipeline may ingest the requests for signing. The keys used in the signing (and corresponding persons/entities that authorize the signings) may be specified by signing pipeline description 224.

Turning to FIG. 2C, a third data flow diagram in accordance with an embodiment is shown. The data flow shown in FIG. 2C may be used to multiply sign a data package (e.g., including a workorder) in accordance with validation rules.

To multiple sign a data package, a signing pipeline that includes any number of signing systems (e.g., 230, 250) may be established. To establish each signing system, as discussed with respect to FIG. 2B, a signing pipeline description may be distributed to each of the signing systems that will participate in the pipeline.

Each signing system may use the signing pipeline description to identify how to sign a data package, where signed data packages should be sent, etc. For example, when signing system 230 ingests the signing pipeline description, signing system 230 may identify (i) which users are required to authorize signing of a data package (e.g., 232), and (ii) that the signed data package (e.g., 240) should be forwarded to additional signing systems 250, in this example scenario. Once identified, signing system 230 may implement signing process 236 based on the signing pipeline description.

During signing process 236, a data package (e.g., 232) may be signed. To sign the data package, authorization for the signing may be sought from a user or entity indicated by the signing pipeline description. If the user authorizes signing of data package 232, user authorization 234 may be provided by the user. The user authorization may be validated by authorization system 238 (e.g., a centralized identity and access management system). The resulting signed data package 240 may be signed using a first private key using a first signing system that is independent of other signing systems and that provides signing services for different pools of users/entities that use distinct identity and access management systems for security purposes.

In this example, signed data package 240 may be forwarded to additional signing systems 250. Each of the additional signing systems (e.g., 252-254) may perform similar signing procedures resulting in multiply signed data package 256. However, in each iteration of the signing, different users/entities may be required to authorize the signing, keys managed by different hardware security modules may be used in the signings, different identity and authorization management systems may be used to confirm authority of the persons/entities authorizing the signings, etc. Consequently, a compromise in any signing system or multiple signing systems may be less likely to compromise a signed data package.

For example, by requiring that multiple signing systems sign a data package, a malicious entity may need to compromise multiple signing systems to obtain signed data packages that are able to pass validation rules implemented by endpoint devices. Accordingly, endpoint devices may be less likely to be able to be compromised by malicious entities through hijacking of signing systems to obtain signed malicious data packages.

Once obtained, multiply signed data package 256 may be distributed to endpoint devices for use in operation.

Turning to FIG. 2D, a fourth data flow diagram in accordance with an embodiment is shown. The data flow shown in FIG. 2D may be used to authenticate multiply signed data packages. The data flow shown in FIG. 2D may be performed, for example, following receipt of a data package indicating a request to perform a workorder by an endpoint device (e.g., 100A).

Prior to servicing the request, the data package may be checked to ascertain whether to trust the request.

For example, management process 260 may be performed. During management process 260, multiply signed data package 256 may be checked to ascertain whether it can be trusted and serviced. To ascertain whether to trust multiply signed data package 256, validation rules 220 may be evaluated to obtain trust decision 264.

Validation rules 220 may, as discussed above, specify any number of requirements that must be met for a request to be trusted. The requirements may specify (i) a number of signatures that must be verifiable using keys of trusted keys 262, (ii) diversity for the keys from trusted keys 262 used to verify the number of signatures, and/or (iii) other requirements.

For example, trusted keys 262 may be divided into groups (e.g., pools). Each pool may include public keys from public private key pairs used by different signing systems to sign requests. A first pool may include any number of public keys associated with, for example, a first organization and a second pool may include any number of public keys associated with a second organization.

In this example, validation rules 220 may specify that (i) a first number of signatures of multiply signed data package 256 must be verifiable using public keys from a first pool of keys in trusted keys 262, and (ii) a second number of signatures of multiply signed data package 256 must be verifiable using public keys from a second pool of keys in trusted keys 262. If met, then multiply signed data package 256 may be trusted.

It will be appreciated that the requirements specified by validation rules 220 may include any number and type of requirements.

In a first example, validation rules 220 may require that at least one key from each group of keys of trusted keys 262 be used to validate a signature of multiply signed data package 256.

In a second example, validation rules 220 may require that at least two keys from each group of keys of trusted keys 262 be used to validate a signature of multiply signed data package 256.

In a third example, validation rules 220 may require that at least one key from at least two groups of keys of trusted keys 262 be used to validate a signature of multiply signed data package 256.

In a fourth example, validation rules 220 may require that at least two keys from at least two groups of keys of trusted keys 262 be used to validate a signature of multiply signed data package 256.

Trusted keys 262 may include any number of groups. The groups may include a same number or larger number of groups as required by validation rules 220.

Each group may include one or multiple keys. Each group may include a same number or a larger number of keys as required by validation rules 220.

Trusted keys 262 may be implemented as a database or other type of data structure. Prior to servicing the request included in the signed data package, endpoint device 100A may verify the integrity of trusted keys 262 during the startup process, etc. For example, trusted keys 262 may be signed using a key for a root of trust of endpoint device 100A, which may be used to verify the integrity of trusted keys 262. If trusted keys 262 cannot be verified, then the request may be automatically rejected.

Figure 2E:
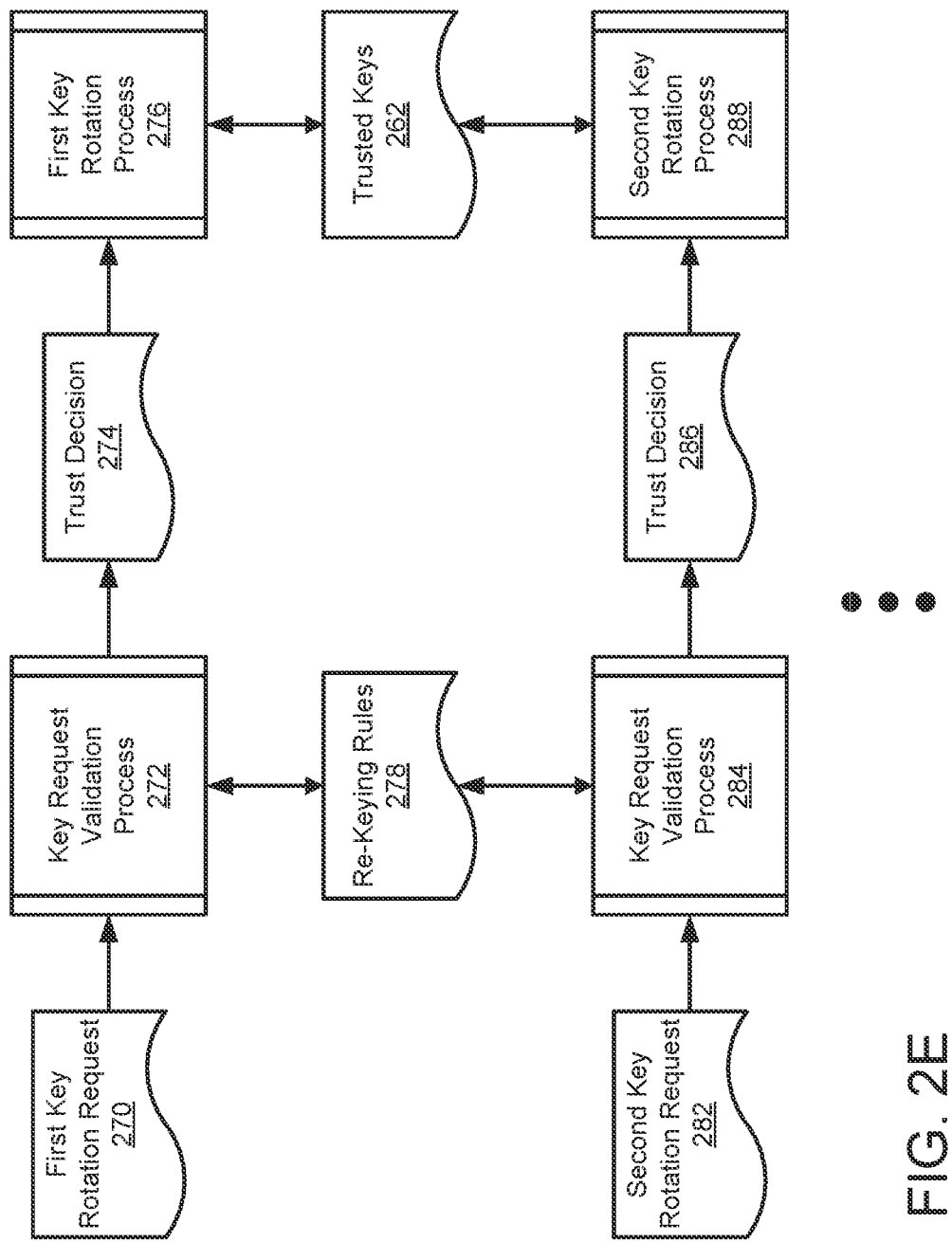

Turning to FIG. 2E, a fifth data flow diagram in accordance with an embodiment is shown. The data flow shown in FIG. 2E may be used to authenticate multiply signed key rotation requests to initiate a staggered key rotation process.

The staggered key rotation process may include sequentially replacing any number of keys (e.g., all keys, a portion of keys) stored in trusted keys 262. The staggered key rotation process may be performed based on a schedule for staggered key rotation (e.g., a previously established schedule, a schedule indicated by a key rotation request). For example, a second key of trusted keys 262 may be rotated immediately upon completion of rotation of a first key of trusted keys 262, and/or after a duration of time (e.g., a minute, an hour, a day).

An entity with authority to rotate keys (e.g., a key manager similar to key manager 104 shown in FIG. 1) may receive first key rotation request 270. First key rotation request 270 may include a multiply signed data structure indicating a request to rotate (e.g., replace) at least a first key of multiple keys. The first key may be associated with a signing system (e.g., of signing systems 102 shown in FIG. 1) and the multiple keys may include any portion of the keys stored in trusted keys 262.

First key rotation request 270 may include: (i) a first signature generated by a first signing system (e.g., 252) and using a second key of the multiple keys, (ii) a second signature generated by a second signing system (e.g., 254)

using a third key of the multiple keys, (iii) an identifier for the first key, the first key being associated with a first public private key pair and a public key of the first public private key pair being stored in trusted keys 262, and/or (iv) other information. The first signing system and the second signing system may be different signing systems than the signing system associated with the first key of the multiple keys.

First key rotation request 270 may be multiply signed by any number of signing systems (e.g., at least the first signing system and the second signing system) and may be generated via feeding the first key rotation request through a signing pipeline via methods and interactions similar to those described in FIGS. 2B-2C with respect to generating multiply signed data package 256.

To validate first key rotation request 270, key request validation process 272 may be performed. During key request validation process 272, first key rotation request 270 may be checked to ascertain whether it can be trusted and serviced. To ascertain whether to trust first key rotation request 270, re-keying rules 278 may be evaluated to obtain trust decision 274.

Re-keying rules 278 may include rules similar to those described in FIG. 2A with respect to validation rules 200. Re-keying rules 278 may specify any number of requirements that must be met for a key rotation request to be trusted. The requirements may specify (i) a number of signatures (e.g., at least two different signatures) that must be verifiable using keys of trusted keys 262, (ii) diversity for the keys from trusted keys 262 used to verify the number of signatures, and/or (iii) other requirements.

Re-keying rules 278 may allow at least the first key to be rotated based on at least two keys of the multiple keys that are different from the first key. Specifically, the first key (e.g., the key to be rotated) may not be one of the at least two different keys. Therefore, the key to be rotated may not contribute to the key rotation request.

For example, trusted keys 262 may be divided into groups (e.g., pools). Each pool may include public keys from public private key pairs used by different signing systems to sign requests. A first pool may include any number of public keys associated with, for example, a first organization and a second pool may include any number of public keys associated with a second organization.

In this example, re-keying rules 278 may specify that (i) a first number of signatures of first key rotation request 270 must be verifiable using public keys from the first pool of keys in trusted keys 262, and (ii) a second number of signatures of first key rotation request 270 must be verifiable using public keys from the second pool of keys in trusted keys 262. If met, first key rotation request 270 may be trusted. Re-keying rules 278 may also specify that the first pool of the keys and the second pool of the keys be any two different pools of keys of multiple pools of keys (e.g., of trusted keys 262).

It will be appreciated that the requirements specified by re-keying rules 278 may include any number and type of requirements.

In a first example, re-keying rules 278 may require that at least one key from each group of keys of trusted keys 262 be used to validate a signature of first key rotation request 270.

In a second example, re-keying rules 278 may require that at least two keys from each group of keys of trusted keys 262 be used to validate a signature of first key rotation request 270.

In a third example, re-keying rules 278 may require that at least one key from at least two groups of keys of trusted keys 262 be used to validate a signature of first key rotation request 270.

In a fourth example, re-keying rules 278 may require that at least two keys from at least two groups of keys of trusted keys 262 be used to validate a signature of first key rotation request 270.

Trusted keys 262 may include any number of groups. The groups may include a same number or larger number of groups as required by re-keying rules 278.

Each group may include one or multiple keys. Each group may include a same number or a larger number of keys as required by re-keying rules 278.

Trust decision 274 may indicate that first key rotation request 270 meets re-keying rules 278 and, therefore, first key rotation request 270 may be serviced.

To service first key rotation request 270, first key rotation process 276 may be performed. First key rotation process 276 may include replacing a first key stored in trusted keys 262. The first key may be associated with a third signing system (e.g., 230 described in FIG. 2C). Therefore, rotating the first key may include replacing the first key (e.g., with another key stored in trusted keys 262 and/or with a newly generated key), updating trusted keys 262 to reflect the replacement of the first key, and/or notifying the third signing system (e.g., 230) of the key rotation.

The third signing system may obtain the replacement key via a secure interaction (e.g., with the key manager, via a trusted platform module (TPM) of the signing system) and may sign future requests using the replacement key.

Once the first key is replaced (e.g., with an updated key) in trusted keys 262, re-keying rules may utilize the updated key to validate future key rotation requests.

As previously mentioned, the staggered key rotation process may include sequentially replacing any number of keys (e.g., all keys, a portion of keys) stored in trusted keys 262.

Rotating a second key of trusted keys 262 may include obtaining second key rotation request 282. Consider a scenario in which three keys are to be rotated during the staggered key rotation process. First key rotation request 270 may have been signed by a second key and a third key. Therefore, second key rotation request 282 may be signed by the updated key (e.g., that replaced the first key) and the third key.

Second key rotation request 282 may indicate that the second key is to be rotated. Second key rotation request 282 may include: (i) a third signature generated by a third signing system (e.g., 230) and using a replaced key (e.g., the updated key), (ii) the second signature (e.g., generated by the first signing system), (iii) an identifier for the second key, the second key being associated with a second public private key pair and a public key of the second public private key pair being stored in trusted keys 262, and/or (iv) other information.

Second key rotation request 282 may be multiply signed by any number of signing systems (e.g., 102) and may be generated via feeding the data structure through a signing pipeline via methods and interactions similar to those described in FIGS. 2B-2C with respect to generating multiply signed data package 256.

To validate second key rotation request 282, key request validation process 284 may be performed. During key request validation process 284, second key rotation request 282 may be checked to ascertain whether it can be trusted and serviced. To ascertain whether to trust second key rotation request 282, re-keying rules 278 may be evaluated to obtain trust decision 286. Key request validation process 284 may include methods similar to those described with respect to key request validation process 272. For example, re-keying rules 278 may allow at least the second key to be rotated based on at least two keys that are different from the second key.

Trust decision 286 may indicate that second key rotation request 282 meets re-keying rules 278 and, therefore, second key rotation request 282 may be serviced.

To service second key rotation request 282, second key rotation process 288 may be performed. Second key rotation process 288 may include replacing the second key stored in trusted keys 262. The second key may be associated with a first signing system (e.g., 252 described in FIG. 2C). Therefore, rotating the second key may include replacing the second key (e.g., with another key stored in trusted keys 262 and/or with a newly generated key), updating trusted keys 262 to reflect the replacement of the second key, and/or notifying the first signing system (e.g., 252) of the key rotation.

The first signing system may obtain a second replacement key via a secure interaction (e.g., with the key manager, via a trusted platform module (TPM) of the signing system) and may sign future requests using the second replacement key.

The staggered key rotation process may include a third key rotation process (not shown) and the third key rotation process may be completed via methods and interactions similar to those described with respect to rotating the first and second keys. Specifically, a third key rotation request (not shown) may be signed by the updated key (e.g., that replaced the first key) and the second updated key (e.g., that replaced the second key). If the third key rotation request is valid, the third key may be replaced in trusted keys 262 and, therefore, all three keys may be rotated.

While described with respect to rotating three keys, any number of keys may be rotated during a staggered key rotation process without departing from embodiments disclosed herein.

Figure 2F:
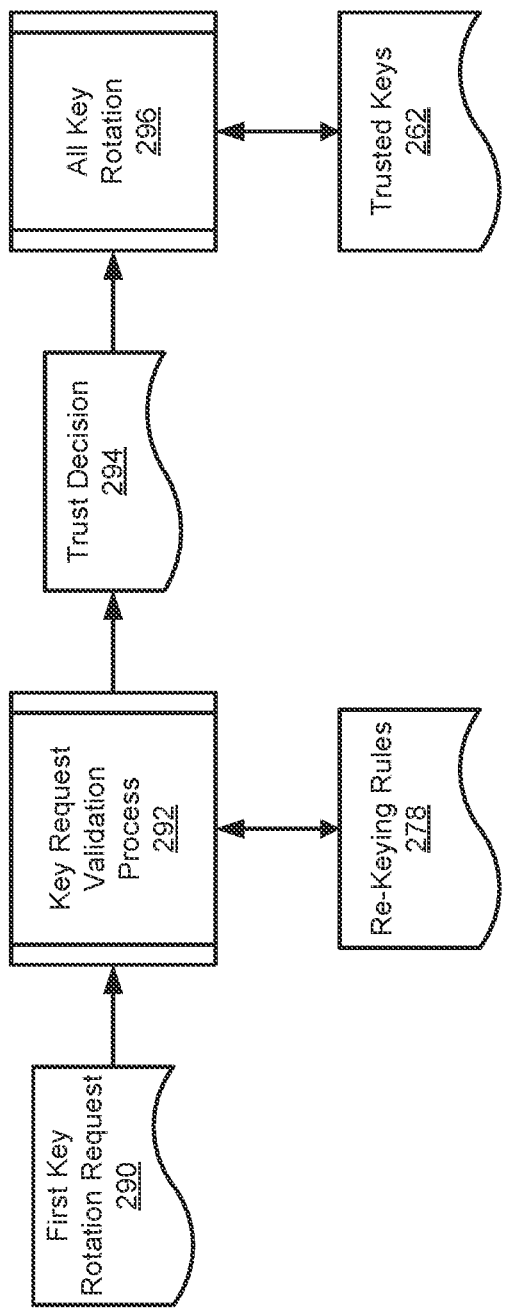

Turning to FIG. 2F, a sixth data flow diagram in accordance with an embodiment is shown. The data flow shown in FIG. 2F may be used to authenticate multiply signed key rotation requests to initiate a simultaneous key rotation process.

An entity with authority to rotate keys (e.g., a key manager similar to key manager 104 shown in FIG. 1) may receive first key rotation request 290. First key rotation request 290 may include a multiply signed data structure indicating a request to rotate (e.g., replace) any number of keys (e.g., all keys currently assigned to signing systems 102) simultaneously. Unlike the staggered key rotation process, the simultaneous key rotation process may rotate all indicated keys concurrently.

Consider a scenario in which three keys are currently assigned to three signing systems and first key rotation request 290 includes a request to rotate all three keys. While described with respect to simultaneously rotating three keys, a simultaneous key rotation process may include rotating any number of keys simultaneously without departing from embodiments disclosed herein.

First key rotation request 290 may include a set of identifiers, the set of identifiers including: (i) a first identifier for a first key to be rotated, (ii) a second key for a second key to be rotated, and (iii) a third identifier for a third key to be rotated.

First key rotation request 290 may be multiply signed by any number of signing systems (e.g., 102) and may be generated via feeding the data structure through a signing pipeline via methods and interactions similar to those described in FIGS. 2B-2C with respect to generating multiply signed data package 256.

To validate first key rotation request 290, key request validation process 292 may be performed. During key request validation process 292, first key rotation request 290 may be checked to ascertain whether it can be trusted and serviced. To ascertain whether to trust first key rotation request 290, re-keying rules 278 may be evaluated to obtain trust decision 294.

In this example (e.g., to service a simultaneous key rotation request), re-keying rules 278 may specify that all keys that are to be rotated must sign first key rotation request 290. Therefore, continuing with the above example, first key rotation request 290 may need to be signed by the first, second, and third key to be considered valid.

Trust decision 294 may indicate that first key rotation request 290 meets re-keying rules 278 and, therefore, first key rotation request 290 may be serviced.

To service first key rotation request 290, all key rotation process 296 may be performed. All key rotation process 296 may include: (i) replacing the first key with a first updated (e.g., replacement) key, (ii) replacing the second key with a second updated key, and (iii) replacing the third key with a third updated key.

The first key may be associated with a particular signing system (e.g., 230 described in FIG. 2C). Therefore, rotating the first key may include replacing the first key (e.g., with another key stored in trusted keys 262 and/or with a newly generated key), updating trusted keys 262 to reflect the replacement of the first key, and/or notifying the signing system (e.g., 230) of the key rotation.

The signing system may obtain the first replacement key via a secure interaction (e.g., with the key manager, via a trusted platform module (TPM) of the signing system) and may sign future requests using the first replacement key.

Replacing the second and third keys may be performed via methods similar to those described with respect to replacing the first key.

By performing the staggered key rotation process described in FIG. 2E, the simultaneous key rotation process described in FIG. 2F, and/or a single key rotation process using methods similar to those described in FIG. 2E with respect to first key rotation process 276, keys may be replaced throughout the distributed environment while reducing a likelihood of unauthorized key rotations and/or unauthorized use of a signing system.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to determine whether to service requests for endpoint devices. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing a request to rotate one or more keys in accordance with an embodiment is shown. The method may be performed, for example, by a key manager, an endpoint device, a signing system, and/or any other entity.

At operation 300, a first key rotation request may be obtained. The first key rotation request may indicate that at least a first key of multiple keys is to be rotated. The first key rotation request may include a first signature generated using a second key of the multiple keys and a second signature generated using a third key of the multiple keys. Obtaining the first key rotation request may include: (i) reading the first key rotation request from storage, (ii) receiving the first key rotation request from another entity (e.g., in the form of a message over a communication system), and/or (iii) other methods.

At operation 302, it may be determined whether the second key and the third key meet re-keying rules for an endpoint device. The determination may be based on the re-keying rules for the endpoint device that allow at least the first key to be rotated based on at least two keys of the multiple keys that are different from the first key.

Determining whether the second key and the third key meet the re-keying rules may include: (i) obtaining the first signature and the second signature used to sign the first key rotation request, and/or (ii) comparing the first signature and the second signature to the re-keying rules and a trusted key repository to determine whether the signatures used to sign the first key rotation request meet the re-keying rules and are included in the trusted key repository.

Determining whether the second key and the third key meet the re-keying rules may also include providing the signed first key rotation request and/or the signatures (e.g., the first signature and the second signature) to another entity responsible for validating the signatures based on the re-keying rules.

If the second key and the third key meet the re-keying rules for the endpoint device, the method may proceed to operation 304.

At operation 304, the first key rotation request may be serviced. Servicing the first key rotation request may include: (i) providing instructions to replace the first key with an updated key (e.g., a replacement key) to a secure key repository, the secure key repository storing at least the first key, (ii) providing instructions to replace the first key to another entity responsible for managing keys, and/or (iii) other methods. By updating contents of the secure key repository, updated multiple keys may be stored by the secure key repository for future use by signing systems.

Providing the instructions to replace the first key may include: (i) generating the updated key, (ii) selecting the updated key from a set of available (e.g., not currently in use) keys stored in the secure key repository, and/or (iii) requesting the updated key from another entity.

Servicing the first key rotation request may also include providing a notification to a first signing system, the first signing system previously being associated with the first key, that the first key has been replaced with the updated key. The notification may include instructions for retrieving the updated key and/or may include the updated key.

The method may end following operation 304.

Returning to operation 302, if the second key and the third key do not meet the re-keying rules for the endpoint device, the method may proceed to operation 306.

At operation 306, the first key rotation request may be declined. Declining the first key rotation request may include: (i) performing no action, (ii) notifying an entity that provided the first key rotation request that the first key rotation request is declined, (iii) storing the first key rotation request in storage, and/or (iv) other methods.

The method may end following operation 306.

The first key rotation request may indicate that rotating the first key is part of a staggered key rotation process in which any number of additional keys are sequentially rotated. Completing a second key rotation process following the first key rotation process may include: (i) obtaining a second key rotation request at a point in time after the first key rotation request is obtained, the second key rotation request including a third signature generated using a replaced key of the updated multiple keys and the second signature, and/or (ii) determining, based on the second key rotation request, whether the replaced key and the second key meet the re-keying rules for the endpoint device. If the replaced key and the second key meet the re-keying rules for the endpoint device, the second key rotation request may be serviced to obtain second updated multiple keys.

The second key rotation request may indicate that the second key is to be rotated. Obtaining the second key rotation request may include methods similar to those described with respect to operation 300.

Determining whether the replaced key and the second key meet the re-keying rules may include methods similar to those described with respect to operation 302.

Servicing the second key rotation request may include methods similar to those described with respect to operation 304 to obtain a replaced second key (e.g., a second updated key).

If the replaced key and the second key do not meet the re-keying rules, the second key rotation request may be declined via methods similar to those described with respect to operation 306.

The second key may, therefore, be replaced with a second replaced key and the contents of the secure key repository may be updated to generate the second updated multiple keys. The staggered key rotation process may continue by rotating a third key. The third key may be rotated, for example, with permission from the replaced key and the replaced second key, etc. Any number of keys may be rotated via the staggered key rotation process.

By doing so, no single key of a set of keys may make a unilateral decision regarding rotation of one or more keys throughout a distributed environment. Consequently, entities with unauthorized access to a key of the multiple keys may not be able to rotate any keys thereby increasing security of the endpoint devices. Similarly, workorders provided by signing systems may be required to be multiply signed to disallow an unauthorized entity from initiating performance of a workorder by an endpoint device.

Turning to FIG. 3B, a flow diagram illustrating a method of managing a workorder for an endpoint device in accordance with an embodiment is shown. The method may be performed, for example, by an endpoint device, a signing system, and/or any other entity.

Prior to obtaining the workorder, an ownership voucher for the endpoint device may be obtained. The ownership voucher may include: (i) a chain of certificates indicating at least one delegation of authority for the endpoint device, and (ii) validation rules.

The validation rules may include rules similar to those described with respect to the re-keying rules and may indicate that workorders be signed with two or more keys to be considered trustworthy. For example, the validation rules may require that the workorder be signed with two private keys that are trusted by the endpoint device.

The validation rules may also require that the workorder be signed with keys that do not have any dependency between them and may provide flexibility in which specific keys and signing frameworks be used. For example, the validation rules may require that multiply signed workorders be signed using (i) different signing frameworks managed by different organizations or groups, (ii) be signed using different private keys, (iii) be signed using multiple signing frameworks and private keys from a range of different signing frameworks and private keys, (iv) be signed a number of times that is dependent on a number of available signing keys, and/or may include different, fewer, and/or additional requirements.

The validation rules may be based on security preferences of an owner of the endpoint device and/or another entity vested with authority over the endpoint device. For example, the endpoint device may be purchased by a customer from a manufacturer of the endpoint device. The manufacturer may communicate directly with the customer to determine security preferences (e.g., the validation rules) from the customer.

Obtaining the ownership voucher may include: (i) reading the ownership voucher from storage, (ii) receiving the ownership voucher from another entity (e.g., via a message transmitted over a communication system), (iii) generating the ownership voucher, and/or (iv) other methods.

At operation 310, a workorder for performance by an endpoint device may be obtained. The workorder may indicate a request for the endpoint device. Obtaining the workorder may include: (i) reading the workorder from storage, (ii) receiving the workorder from another entity (e.g., in the form of a message over a communication system), and/or (iii) other methods.

At operation 312, it may be determined whether the workorder is to be performed. The determination may be based on the validation rules for the endpoint device that allow for the workorder to be considered trustworthy based on at least two different keys. Determining whether the workorder is trustworthy may include: (i) obtaining signatures used to sign the workorder, and/or (ii) comparing the signatures to the validation rules and a trusted key repository to determine whether the signatures used to sign the workorder meet the validation rules and are included in the trusted key repository. Determining whether the workorder is trustworthy may also include providing the signed workorder and/or the signatures to another entity responsible for validating the signatures based on the validation rules.

If the workorder is to be performed, the method may proceed to operation 304.

At operation 314, an action may be performed based on the workorder to provide computer-implemented services. Performing the action may include (i) reading the instructions for the action from the validated workorder, and/or (ii) initiating performance of the action by the endpoint device.

The method may end following operation 314.

Returning to operation 312, if the workorder is not to be performed, the method may proceed to operation 316.

At operation 316, the workorder may be declined to be performed. Declining to perform the workorder may include: (i) performing no action, (ii) notifying an entity that provided the workorder that the request is declined, (iii) storing the workorder in storage, and/or (iv) other methods.

The method may end following operation 316.

Figure 4:
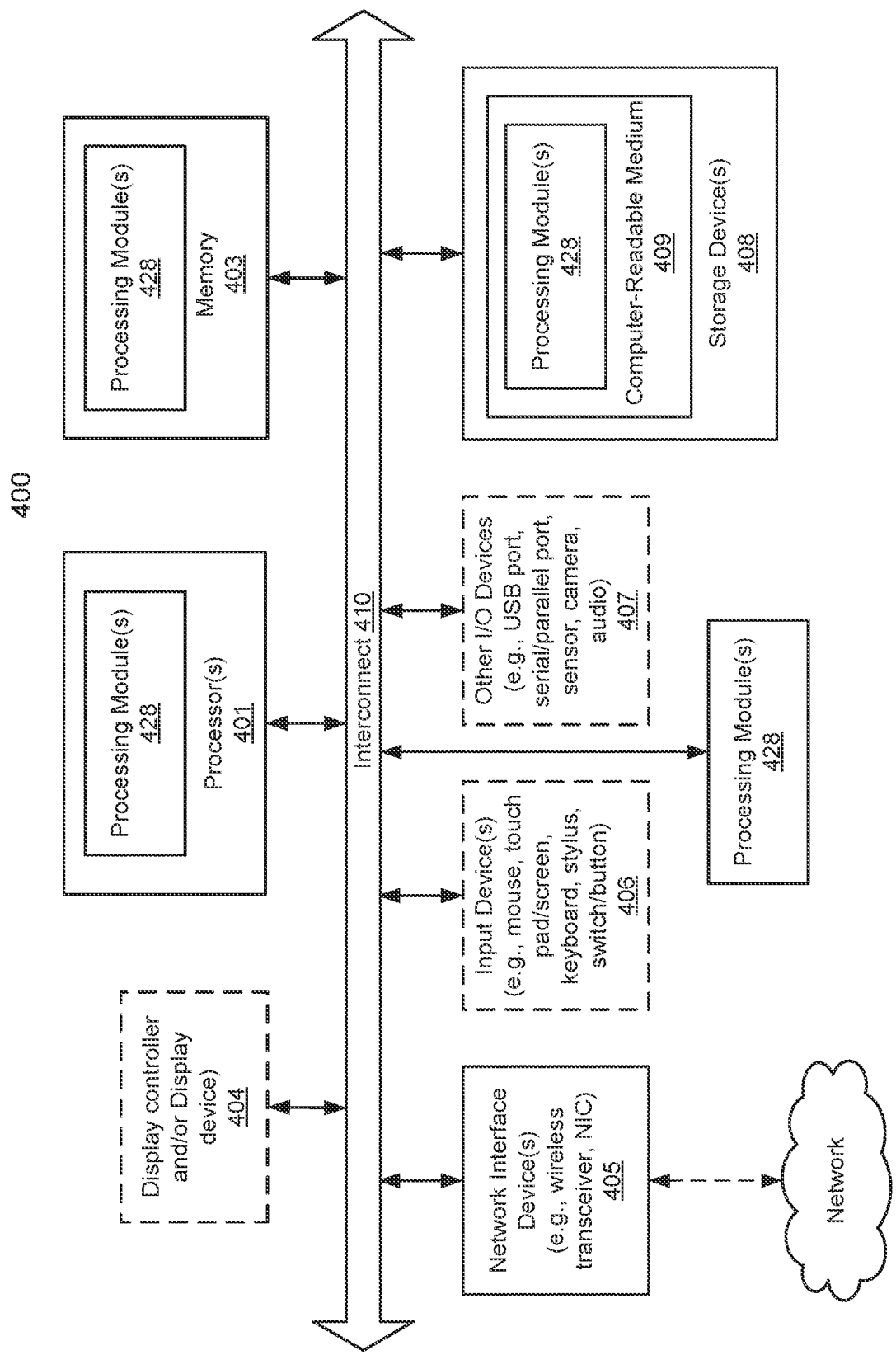
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

The invention claimed is:

1. A method of managing security for an endpoint device, the method comprising:
   obtaining a first key rotation request, the first key rotation request indicating that at least a first key of multiple keys is to be rotated, and the first key rotation request comprising:
      a first signature generated by a first signing system and using a second key of the multiple keys; and
      a second signature generated by a second signing system and using a third key of the multiple keys;
   making a first determination, based on the first key rotation request, regarding whether the second key and the third key meet re-keying rules for the endpoint device, the re-keying rules allowing at least the first key to be rotated based on at least two keys of the multiple keys that are different from the first key;
   in an instance of the first determination in which the second key and the third key meet the re-keying rules for the endpoint device:
      servicing the first key rotation request to obtain updated multiple keys; and
      obtaining a second key rotation request, the second key rotation request comprising: the second signature; and a third signature generated by a third signing system and using a replaced key of the updated multiple keys.

2. The method of claim 1, wherein the re-keying rules utilize the updated multiple keys after the first key rotation request is serviced.

3. The method of claim 2, wherein the first key rotation request is part of a staggered key rotation process for the multiple keys, and the staggered key rotation process comprises the second key rotation request, and the method further comprises:
   making a second determination, based on the second key rotation request, regarding whether the replaced key and the second key meet the re-keying rules for the endpoint device, the re-keying rules allowing the second key to be rotated based on at least two keys of the updated multiple keys that are different from the second key; and
   in an instance of the second determination in which the replaced key and the second key meet the re-keying rules for the endpoint device:
      servicing the second key rotation request to obtain second updated multiple keys.

4. The method of claim 1, wherein the first key rotation request indicates that all keys of the multiple keys are to be rotated, and the re-keying rules require that the first key rotation request comprises signatures generated with all of the multiple keys.

5. The method of claim 1, wherein the re-keying rules specify that the first key rotation request be multiply signed with at least two different keys.

6. The method of claim 5, wherein the re-keying rules further specify that the first key is not one of the at least two different keys.

7. The method of claim 5, wherein the re-keying rules further specify that the first key of the at least two different keys be from a first pool of keys and the second key of the at least two different keys be from a second pool of keys.

8. The method of claim 7, wherein the re-keying rules further specify that the first pool of keys and the second pool of keys be any two different pools of keys of multiple pools of keys.

9. The method of claim 7, wherein the first pool of keys comprises keys associated with a first organization and the second pool of keys comprises keys associated with a second organization.

10. The method of claim 5, wherein the re-keying rules further specify that the first key rotation request be multiply signed with two keys from a first pool of keys and two keys from a second pool of keys.

11. The method of claim 1, further comprising:
after the updated multiple keys are obtained:
obtaining a workorder for performance by the endpoint device;
evaluating whether to perform the workorder using at least the updated multiple keys; and
in an instance of the evaluating where the workorder is to be performed:
performing an action based on the workorder to provide computer-implemented services.

12. A non-transitory machine-readable medium having instructions stored therein, which when executed by a processor, cause the processor to perform operations for managing an endpoint device, the operations comprising:
obtaining a first key rotation request, the first key rotation request indicating that at least a first key of multiple keys is to be rotated, and the first key rotation request comprising:
a first signature generated by a first signing system and using a second key of the multiple keys; and
a second signature generated by a second signing system and using a third key of the multiple keys;
making a first determination, based on the first key rotation request, regarding whether the second key and the third key meet re-keying rules for the endpoint device, the re-keying rules allowing at least the first key to be rotated based on at least two keys of the multiple keys that are different from the first key;
in an instance of the first determination in which the second key and the third key meet the re-keying rules for the endpoint device:
servicing the first key rotation request to obtain updated multiple keys; and
obtaining a second key rotation request, the second key rotation request comprising: the second signature; and a third signature generated by a third signing system and using a replaced key of the updated multiple keys.

13. The non-transitory machine-readable medium of claim 12, wherein the re-keying rules utilize the updated multiple keys after the first key rotation request is serviced.

14. The non-transitory machine-readable medium of claim 13, wherein the first key rotation request is part a staggered key rotation process for the multiple keys, and the staggered key rotation process comprises the second key rotation request, and the operations further comprise:
making a second determination, based on the second key rotation request, regarding whether the replaced key and the second key meet the re-keying rules for the endpoint device, the re-keying rules allowing the second key to be rotated based on at least two keys of the updated multiple keys that are different from the second key; and
in an instance of the second determination in which the replaced key and the second key meet the re-keying rules for the endpoint device:
servicing the second key rotation request to obtain second updated multiple keys.

15. The non-transitory machine-readable medium of claim 12, wherein the first key rotation request indicates that all keys of the multiple keys are to be rotated, and the re-keying rules require that the first key rotation request comprises signatures generated with all of the multiple keys.

16. The non-transitory machine-readable medium of claim 12, wherein the re-keying rules specify that the first key rotation request be multiply signed with at least two different keys.

17. A data processing system, comprising:
a processor; and
a memory coupled to the processor to store instructions, which when executed by the processor, cause the processor to perform operations for managing an endpoint device, the operations comprising:
obtaining a first key rotation request, the first key rotation request indicating that at least a first key of multiple keys is to be rotated, and the first key rotation request comprising:
a first signature generated by a first signing system and using a second key of the multiple keys; and
a second signature generated by a second signing system and using a third key of the multiple keys;
making a first determination, based on the first key rotation request, regarding whether the second key and the third key meet re-keying rules for the endpoint device, the re-keying rules allowing at least the first key to be rotated based on at least two keys of the multiple keys that are different from the first key;
in an instance of the first determination in which the second key and the third key meet the re-keying rules for the endpoint device:
servicing the first key rotation request to obtain updated multiple keys; and
obtaining a second key rotation request, the second key rotation request comprising: the second signature; and a third signature generated by a third signing system and using a replaced key of the updated multiple keys.

18. The data processing system of claim 17, wherein the re-keying rules utilize the updated multiple keys after the first key rotation request is serviced.

19. The data processing system of claim 18, wherein the first key rotation request is part a staggered key rotation process for the multiple keys, and the staggered key rotation process comprises the second key rotation request, and the operations further comprise:
making a second determination, based on the second key rotation request, regarding whether the replaced key and the second key meet the re-keying rules for the endpoint device, the re-keying rules allowing the second key to be rotated based on at least two keys of the updated multiple keys that are different from the second key; and
in an instance of the second determination in which the replaced key and the second key meet the re-keying rules for the endpoint device:
servicing the second key rotation request to obtain second updated multiple keys.

20. The data processing system of claim 17, wherein the first key rotation request indicates that all keys of the multiple keys are to be rotated, and the re-keying rules require that the first key rotation request comprises signatures generated with all of the multiple keys.

* * * * *